Figure 1:
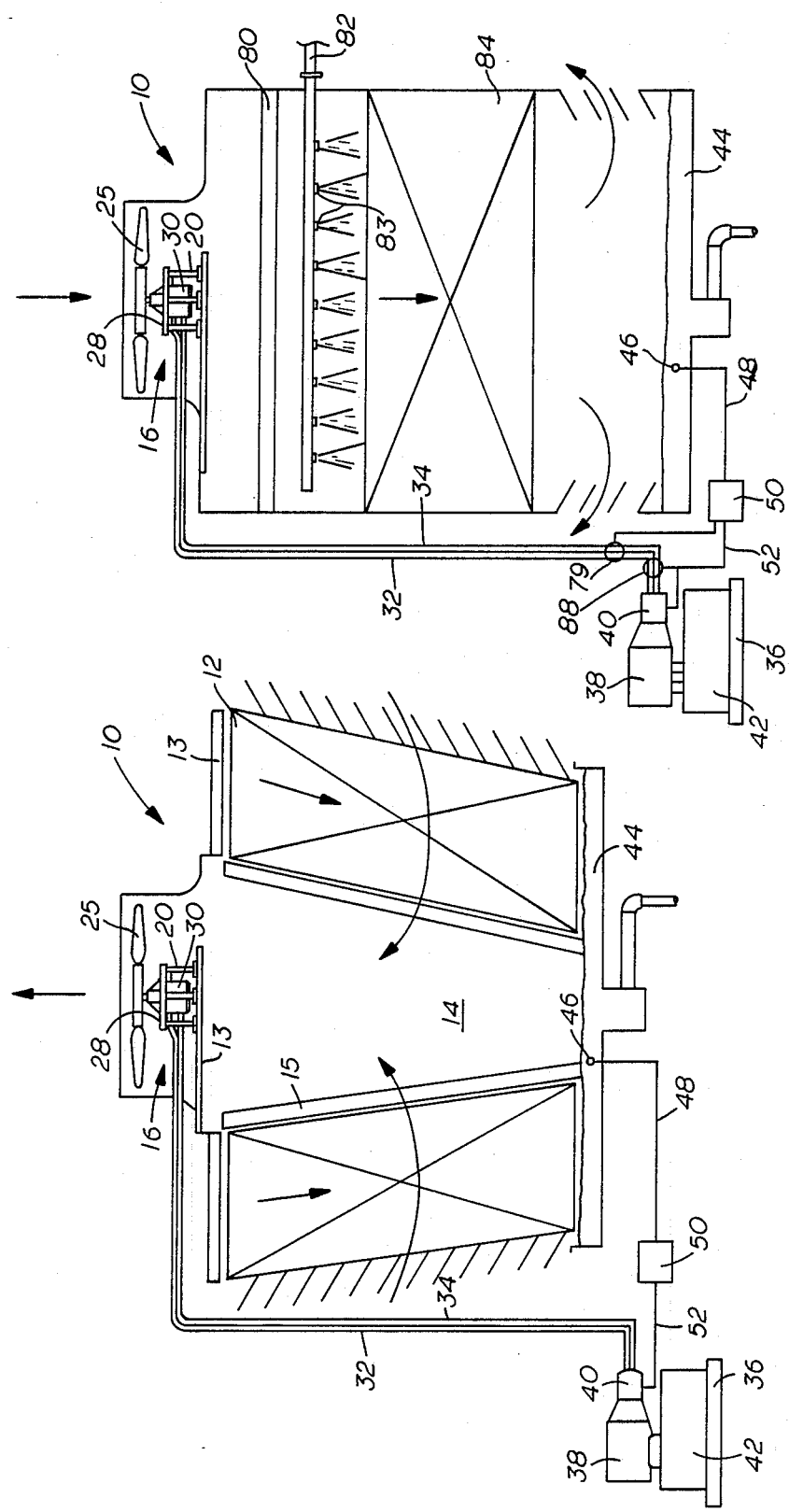

United States Patent [19]

Dickerson

[11] Patent Number: 4,955,585
[45] Date of Patent: Sep. 11, 1990

[54] HYDRAULICALLY DRIVEN FAN SYSTEM FOR WATER COOLING TOWER

[76] Inventor: John A. Dickerson, 15660 W. Hardy, Ste. 130, Houston, Tex. 77060

[21] Appl. No.: 369,814

[22] Filed: Jun. 22, 1989

[51] Int. Cl.$^5$ ............................................... B01F 3/04
[52] U.S. Cl. .......................................... 261/26; 261/25; 261/39.1; 261/109; 261/DIG. 77; 261/DIG. 11; 91/506; 417/375
[58] Field of Search .................. 261/25, 26, 39.1, 109, 261/DIG. 77, DIG. 11; 91/504, 506; 417/375

[56] References Cited

U.S. PATENT DOCUMENTS

| | | | |
|---|---|---|---|
| 621,718 | 3/1899 | Seymour, Jr. | 261/25 |
| 2,506,790 | 5/1950 | Ihrig et al. | 417/375 |
| 2,751,144 | 6/1956 | Troendle | 417/375 |
| 3,195,870 | 7/1965 | Gruber et al. | 261/109 |
| 3,669,421 | 6/1972 | Murphy | 261/25 |
| 3,925,523 | 12/1975 | Cates | 261/109 |
| 4,154,185 | 5/1979 | Hackman et al. | 417/375 |
| 4,252,751 | 2/1981 | Shito | 261/109 |
| 4,443,389 | 4/1984 | Dodds | 261/25 |
| 4,487,108 | 12/1984 | McLuen | 91/504 |
| 4,555,978 | 12/1985 | Burandt et al. | 91/506 |

Primary Examiner—Tim Miles
Attorney, Agent, or Firm—Bernard A. Reiter; James L. Jackson

[57] ABSTRACT

An energy conserving highly efficient hydraulically energized cooling tower fan system is provided having a rotary fan and hydraulic motor for operation thereof located at elevation within the upper portion of a cooling tower. An axial piston, variable displacement, pressure compensation hydraulic pump and its electric motor, together with a hydraulic fluid reservoir, hydraulic fluid filters and coolers arranged in closed loop assembly are located remotely from the hydraulic motor and fan assembly such as at ground level, to facilitate ease of maintenance and to minimized fire hazard and electrical hazard within the cooling tower itself. The rotational speed of the cooling tower fan is within a predetermined infinitely variable range and is controlled responsive to the temperature sensed in the cool water basin of the cooling tower by a temperature sensor and controller which controls the velocity of fluid output from the hydraulic pump. The hydraulic pump system is also equipped to reverse the characteristics of flow to the hydraulic motor to thereby reverse the operational rotation of the fan according to the temperature of water sensed within the water tower system.

21 Claims, 2 Drawing Sheets

HYDRAULICALLY DRIVEN FAN SYSTEM FOR WATER COOLING TOWER

1. FIELD OF THE INVENTION

This invention pertains generally to water tower cooling systems such as are in wide use for the purpose of cooling water and other such fluids by means of fan induced air circulation to thus provide for heat exchange. More specifically, the present invention is directed to a hydraulic fan system that is powered by an electric motor and hydraulic pump assembly which is placed at a safe, ground level location and which is coupled hydraulically with the hydraulic motor of one or more fans that are mounted at the service deck elevation in a water tower.

2. BACKGROUND OF THE INVENTION

One conventional method of cooling water for the purpose of heat exchange is to circulate the heated water downwardly through a cooling tower that separates the water into droplets, thus dramatically increasing its exposed surface area. Simultaneously air is circulated through the various trays of the cooling tower to enhance its heat exchange characteristics. Although water cooling towers of this general nature have been in wide use for many years and have been powered by systems of varying nature, including mechanical drive systems, electrical drive systems, hydraulic energization, etc., most recently it has been the practice to provide water cooling tower systems with electrically energized drive systems for fan operation. In such cases, the cooling air is moved by a rotating fan turned by a fan deck mounted speed-reducing gear box connected to an electric motor by a shaft and flexible couplings. The electric motor, shaft and flexible couplings generally are mounted on the fan deck of the water tower which is itself mounted at a substantial height above the ground level. While such systems function adequately, they nevertheless have significant disadvantages from the standpoint of operation, safety, efficiency, etc.

The electric motor, shaft and coupling assembly, together with the fan mechanism are quite heavy and therefore place significant weight at the upper portion of the water cooling tower. This of course requires the structure of the cooling tower to be capable of supporting this significant weight, which typically adds to the cost to the cooling tower structure itself. It is desirable to provide a cooling tower fan assembly having minimal weight characteristics to thereby more efficiently provide for its support in the upper portion of a cooling tower without necessitating that the cooling tower be designed to support a heavy cooling fan system.

Because cooling tower fan assemblies in use at the present time are typically powered by electric motors, these motors and other electrically equipment associated therewith constitute an electrical hazard and a fire hazard that can subject personnel and equipment to a certain degree of danger. Maintenance activities for these types of motor driven fan assemblies require service personnel to gain access to the fan deck in the upper portion of the cooling tower. Obviously the fan deck can become slippery due to build up of deposits that result from circulation of water or other cooling tower fluid through the cooling tower system. Maintenance workers can therefore be subject to injury by falling because of these slippery surfaces. Further, since the electric motor is operative in a "wet" environment, being physically located in the upper portion of the cooling tower, it can subject maintenance workers to electrical hazards when maintenance activities are being conducted about the motor or fan assembly. Further, degradation of the electrical motor during its service life can result in the creation of a fire hazard for the cooling tower structure. Since cooling towers typically incorporate wood in a significant portion of the structure thereof, although the wood is typically liquid soaked and not easily ignited, nevertheless a deteriorated electrical motor and its electrical components can develop a fire hazard due to electrical arcing. Such fire hazards are especially dangerous to workers that might be present at the mechanical deck of the cooling tower should electrical arcing develop.

As mentioned above, the fan assembly of a typical cooling tower incorporates a speed-reducing gear box that is connected in driven relation to an electric motor and in driving relation to a shaft and flexible couplings. These mechanical structures, being operative in the "wet" environment of the cooling tower and being more or less continuously operated, will deteriorate after a period of time and require replacement. Replacement operations for such mechanical devices as the speed reducing gear box or the electric motor will require significant effort on the part of maintenance personnel and significant down time of the cooling tower system simply due to the necessity of conducting these operations at the fan deck elevation of the cooling tower. Moreover, special lifting equipment may be required as well. It is desirable, therefore, to provide a cooling tower system having a fan assembly that is capable of simple and quick maintenance or replacement should such servicing activities, be required.

When operable in a warm climate most cooling tower systems are not subject to freezing. However cooling towers that are located in cooler climates frequently require considerable maintenance to prevent freezing during cold weather conditions. Further, the tendency of freezing is enhanced because for the most part, the fan systems of the cooling towers are limited to unidirectional rotation. Such cooling towers must ordinarily be provided with an anti-freeze additive to prevent freezing of the cooling tower fluid. This of course increases to the cost of operation of the cooling tower and thus results in a commercial disadvantage for the commercial system incorporating the cooling tower. It is desirable to provide a cooling tower system that is capable of being efficiently controlled in a manner that will significantly reduce the likelihood of freezing during cold weather conditions.

Most cooling tower systems having electric motors, gear box and shaft drive mechanisms such as that set forth above, typically incorporate a unidirectional drive system that is capable of operation only at a designed fan drive speed. Obviously when the cooling tower fan system is only capable of single speed operation, its speed must be characterized according to the maximum heat transfer conditions that can be expected at any given point in time. For this reason, cooling tower fan systems are not ordinarily energy efficient. Typically, the electric motor and fan drive systems of most cooling tower mechanism are engineered to produce 100% CFM of peak air on demand. Therefore, in climates having only two or three months of elevated temperatures during the year, while the rest of the year is significantly cooler, there is typically a substantial over use of energy with a constant peak RPM fan drive system which thus over produces cooling air and wastes energy. It is desirable therefore to provide a cooling tower fan drive system that has the capability of efficiently operating at speeds that are selected responsive to the heat exchange requirements that exist in any given point of time. It is desirable to provide a cooling tower fan system incorporating a controller to automatically adjust the speed of the fan and hence the cooling system to process requirements determined by ambient temperatures of the environment.

When cooling towers are subjected to hazardous weather conditions such as tornados, hurricains etc. high velocity wind conditions can cause severe damage to the large, relatively light weight fan structures that are typically provided in most cooling towers. Where there is sufficient advance warning of such hazardous weather conditions it is typically appropriate for maintenance personnel to enter the water tower, climb to the elevation of the fan system and physically secure the fan against rotation by tying it to the water tower structure by means of ropes or other such devices. After the adverse weather condition has dissipated it is then necessary for maintenance personnel to again climb into the tower to release the fan for normal operation. These activities require labor and therefore expense that might be avoided. Also, such activities subject maintenance personnel to a certain degree of danger especially if the fans are being secured during turbulent, windy conditions. It is also desirable therefore to provide a novel cooling tower fan system wherein the fan may be effectively secured against rotation without necessitating entry of the water tower system by maintenance personnel to either secure or release the fan.

3. SUMMARY OF THE INVENTION

It is a primary feature of this invention to provide a novel fan system for cooling towers and the like which automatically adjusts fan speed to heat load conditions and therefore is operable at maximum efficiency for conserving the electrical energy required for fan operation.

It is also a feature of this invention to provide a novel fan operating system wherein a significant part of the fan operating mechanism may be located to provide easy access for efficient maintenance thereof.

It is another feature of the present invention to provide a novel cooling tower fan system wherein minimal machinery weight is concentrated in the upper portion of a cooling tower to thus permit the cooling tower to have minimal structural requirements and yet provide efficient and adequate support for the fan assembly.

It is also a feature of this invention to provide a novel cooling tower fan system wherein electrical hazards and fire hazards to personnel and equipment are effectively minimized.

It is another important feature of this invention to provide a novel cooling tower fan system which is effectively controllable manually or automatically in direct response to the heat load requirements that exist at any point in time, thus providing for efficient cooling tower operation while at the same time minimizing the overall cost of operation of the cooling tower system.

It is another feature of this invention to provide a novel cooling tower fan system that is effective to minimize freezing of the water during cold water conditions, without necessitating the use of anti-freeze additives in the cooling tower fluids.

It is also an important feature of this invention to provide a novel cooling tower fan system that effectively minimizes electrical hazards and fire hazards to personnel and equipment during operation and or maintenance thereof.

It is also an important feature of this invention to provide a novel cooling tower fan system that may be effectively locked against rotation without necessitating direct access to the fan or fan motor by maintenance personnel.

Accordingly the principles of the present invention are realized through the use of a hydraulically energized cooling tower fan system wherein a fan mechanism is supported by the equipment deck of a cooling tower structure. The fan mechanism incorporates a light weight hydraulic motor having its output shaft connected directly to the shaft of the fan. Hydraulic supply and return lines extend from the hydraulic motor downwardly along the cooling tower to a location at or near ground level or at any other suitable location where they are coupled with a hydraulic pump and reservoir assembly to complete a closed loop hydraulic circuit. The hydraulic pump is operated by an electric motor also located at ground level and this motor is typical of industrial electric motors in that it is only capable of unidirectional rotation and has a single operating speed. The output shaft of the motor is directly connected to the input shaft of the hydraulic pump and thus operates the hydraulic pump at a constant rotary input shaft speed. The motor and pump assembly also incorporate a reservoir to receive the hydraulic fluid from the return line and subject it to a filtering and cooling process so that clean, cool hydraulic fluid is provided to the suction of the hydraulic pump. The hydraulic pump conducts pressurized hydraulic fluid to the hydraulic motor of the fan assembly to thus impart rotation to the fan The cooling tower fan system of this invention minimizes cost of cooling tower operation by minimizing the cost of electrical energy required for its operation. The fan speed is variable and is automatically adjusted to heat load conditions to which the cooling tower system is subjected. Thus electrical energy for driving the hydraulic system to achieve fan rotation is minimized at all conditions of cooling tower operation. Excessive electrical energy is not used during low head load conditions. This cooling tower fan operating system will make it possible through operational cost savings to achieve capital recovery within a much shorter period of time as compared with the fixed speed electrically energized fan system described above.

Location of the motor, hydraulic pump and pump reservoir systems at ground level or at other suitable locations provide users with exceptional efficiency and cost savings from the standpoint of maintenance. By being readily accessible, without the need for maintenance personnel to enter the water tower, maintenance is safer and can be accomplished at lower cost and greater frequency as compared with conventional cooling tower fan systems.

The hydraulic pump is typically an axial piston, variable displacement, pressure compensated pump consisting of a shaft driven cylinder barrel and a plurality of pistons. The stroke of the pistons is variable depending upon the position of a rocker cam or wobble plate assembly to which the pistons are operatively interconnected. The angular position of the rocker cam is controlled by a stroking vane mechanism and is responsive to a controller that senses the temperature of the water or other liquid in the cool water basin of the cooling tower. Thus, the position of the rocker cam assembly and the stroke of the pistons is variably controlled in response to the temperature condition of the cooled water of the cooling tower. Since the stroke of the pistons established by the rocker cam assembly controls the hydraulic fluid output velocity being pumped at any given time, the operating speed of the fan being driven by the hydraulic motor is thus also rendered infinitely controllable in response to the water temperature of the cooling tower or to any other suitable data that is determinative of the efficiency of the cooling tower.

Although the present invention is described to particularly as it relates to the use of an axial piston, variable displacement, pressure compensated pump such is not intended to limit the scope of the invention. Other suitable types of hydraulic pumps may be effectively utilized within the spirit and scope of this invention.

The fan system further incorporates a fan locking system which permits the fan to be locked against rotation to secure the fan during heavy weather conditions where violent wind is likely to be encountered. This fan locking system may incorporate a hydraulic locking arrangement such as locking valves that may be closed in both the supply and return lines of the hydraulic system to prevent circulation of hydraulic fluid through the fan motor and thus lock the fan against rotation. This fan locking system may be operated from ground level to preclude the necessity of maintenance personnel to gain direct access to the fan inside the water tower for the purpose of physically securing the fan against rotation. This feature saves labor costs and provides a safe working environment for maintenance personnel.

4. BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted however that the appended drawings illustrate only typically embodiments of this invention and are therefore not to be considered limiting of its scope, for the invention may admit to other equally effective embodiments.

In the drawings:

FIG. 1. is a sectional diagrammatic view of a cooling tower shown to be provided with a hydraulically energized fan system constructed in accordance with the present invention and being controllable responsive to water temperature.

Figure 2:
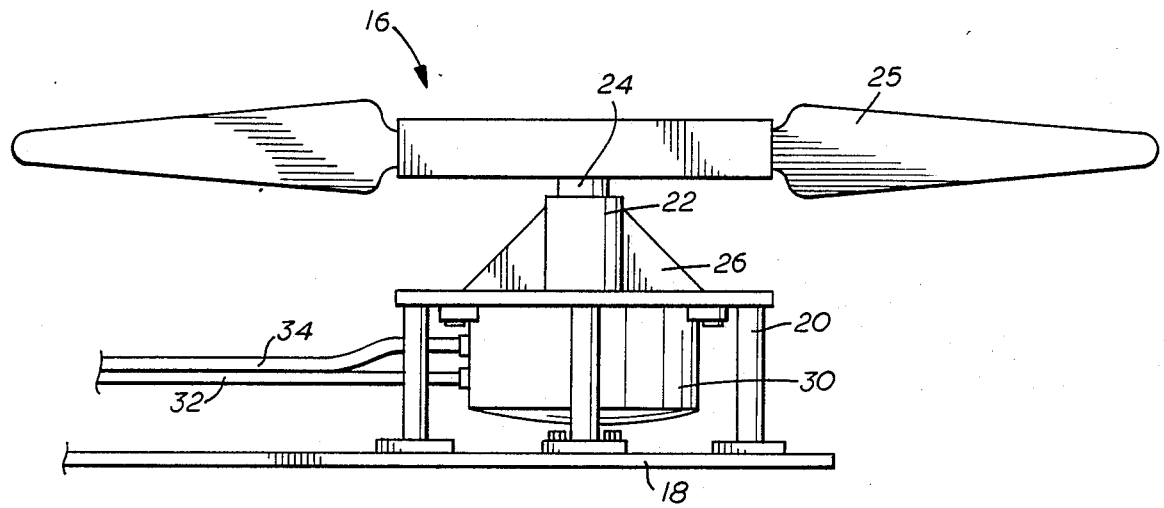

FIG. 2. is a pictorial representation shown in partial sectional view of a hydraulically energized fan assembly positioned at the machinery deck in the upper portion of a conventional cooling tower.

Figure 3:
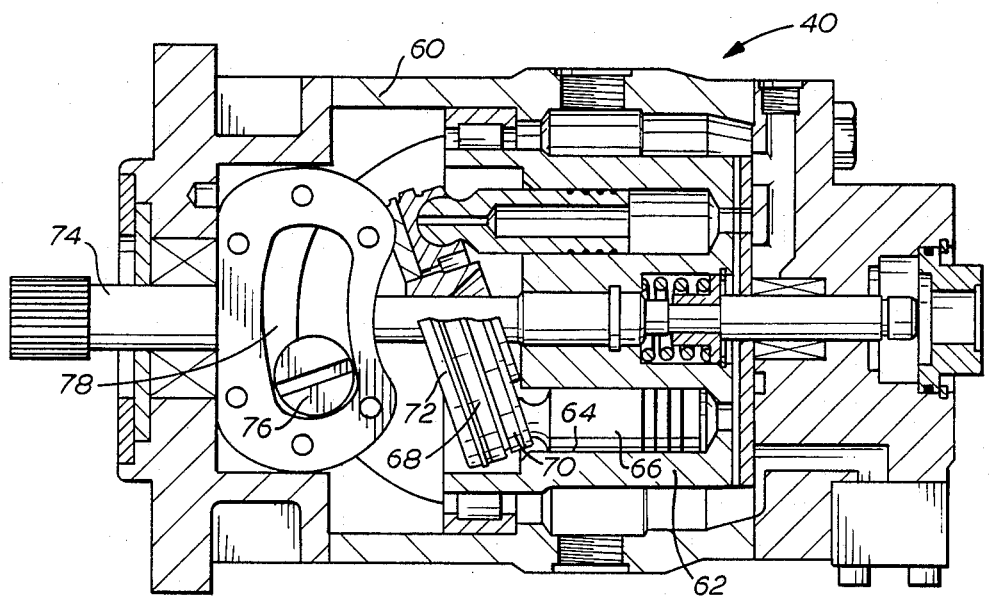

FIG. 3. is a sectional view of an axial piston, variable volume pressure compensated pump that is exemplary for use as the electrically energized hydraulic power source of the cooling tower fan assembly for this invention.

FIG. 4. is a sectional view of a cooling tower structure shown to be provided with the hydraulically energized fan assembly of the present invention and being adapted for counter-flow operation.

5. DETAILED DESCRIPTION OF PREFERRED EMBODIMENT

Referring now to the drawings and first to FIG. 1. a cooling tower is shown generally at 10 which includes appropriate fill packing 12 of any suitable type to facilitate distribution of water as it passes downwardly through the cooling tower after being sprayed or otherwise distributed at the upper portion of the cooling tower by means of a water distribution deck such as shown at 13. The cooling tower also incorporates drift eliminators as shown in 15 which normally form the extreme inwardly portion of the water air interface structure of the cooling tower and cooperate to define an inner chamber 14 which receives air that has passed through the fill packing and drift eliminators. Basically, cooling tower chamber 14 is a suction chamber for the fan assembly 16 which is located in the upper portion of the cooling tower. The cooling tower is provided with a machinery deck 18 on which the support structure 20 of the fan assembly rests.

The fan assembly is shown in greater detail in FIG. 2 wherein the fan support structure 20 includes a plurality of upstanding support members that provide structural support for a generally vertical fan bearing housing 22. The bearing housing incorporates an internal bearing assembly (not shown) which provides rotatable mounting support for a fan shaft 24. To the fan shaft 24 is mounted a plurality of fan blades 25 which, when rotated, in the normal direction induce an upward flow of air in the chamber 14 and thus cause air to be drawn through the fill packing and drift eliminators where it contacts water droplets cascading downwardly and removes heat from the water. The fan assembly will typically incorporate a plurality of gussets 26 which project upwardly from a mounting plate 28 and provide structural support for the fan bearing housing 22.

The mounting plate 28 also provides structural support for a light weight hydraulic motor 30 which is secured by bolts or by other suitable means of attachment to the lower surface portion of the mounting plate. Supply and return lines 32 and 34 respectively, extend from the external case of the hydraulic motor 30 and, as shown in FIG. 1. traverse downwardly to ground level is provided a structural support 36 which may take any suitable form such as a concrete pad, metal skid or other support structure. As mentioned above, the motor, pump and reservoir assembly may be located other than at ground level if desired. On the support pad 36 is located an electric motor 38 disposed in driving relation with a hydraulic pump 40 having, as its discharge line, the hydraulic supply line 32 of the hydraulic motor 30. A hydraulic reservoir 42 is also mounted on the support structure and may, as shown, provide structural support for the motor and pump assembly. Typically, the hydraulic fluid reservoir 42 will be in communication with the hydraulic return line 34 such that it receives the hydraulic fluid and conditions it for further circulation by the hydraulic pump 40. Typically the hydraulic fluid reservoir will incorporated appropriate filters for the purpose of cleaning the hydraulic fluid to ensure that the hydraulic pump 30 is also provided with clean hydraulic fluid for its operation. The hydraulic fluid reservoir 42 will also typically be provided with a hydraulic oil cooling system which will ensure that the hydraulic fluid being supplied to the hydraulic motor 30 will always be sufficiently cool that it is well below its flash point. This feature ensures that the hydraulic fluid cannot constitute a fire hazard in the event the hydraulic fluid should leak from the motor or should a hydraulic line rupture and discharge hydraulic oil into the hydraulic cooling tower system.

The cooling tower system incorporates a cool water storage basin 44 which receives the water or other coolant after it has passed through the cooling tower and has been appropriately cooled. It is of course desirable to ensure that the water temperature in the basin 44 is at an appropriately low temperature for further use by the industrial process being served by the cooling tower. It is desirable that the cooling fan assembly 16 operate at a speed for any particular ambient condition that will provide sufficient cooling of the water as it passes downward through the cooling tower, such that it arrives at the cool water basin 44 at a desired temperature. This feature is effectively accommodated by the hydraulic pump 40 and its control system. The hydraulic pump 40, as mentioned above, is an axial piston, variable displacement, pressure compensated pump that is capable of providing a variable discharge having a range of volumetric discharge designed within minimum and maximum velocity levels. Specific features of the hydraulic pump 40 will be discussed in detail hereinbelow in connection with FIG. 3.

Within the cool water basin 44 is provided a temperature sensor 46 which provides a temperature responsive signal that is transmitted by an electrical conductor 48 to a controller 50. The controller 50 provides a control signal output which is transmitted by a conductor 52 to the control system of the hydraulic pump 40 for adjustment of the discharge of the pump. Thus, the output of the hydraulic pump 40 is established responsive to the temperature of the water in the cool water basin 44.

With reference now to FIG. 3. a representative hydraulic pump for accomplishing fan speed control according to the principles of this invention may conveniently take the form shown generally at 40. The pump 40 incorporates a pump housing 60 within which is disposed a pump cylinder 62 having formed therein a plurality of internal cylinders 64 having pistons 66 movably disposed therein. The pistons 66 are operatively connected to a piston shoe 68 that is coupled with a shoe retainer plate 70. The shoe retainer plate is angularly positioned within the housing by means of a cam plate 72, also referred to as a rocker cam, which is rotatably supported by an axially oriented rotatable shaft 74. The shaft 74 is an input shaft and is splined, or otherwise adapted for connection to the output shaft of the electric motor 38. The angular position of the rocker cam 72 with respect to the rotatable shaft 74 is established by a stroking vane 76 which is movably disposed within an arcuate stroking vane chamber 78. The position of the stroking vane within the chamber 78 determines the angle of inclination of the rocker cam 72 relative to the shaft 74 and thus, due to the controlling engagement between the rocker cam and the shoe retainer plate, induces angular reciprocation of the shoe retainer plate within the pump housing. The pistons 66 are coupled in driving with relation with the shoe retainer plate and therefore the angular reciprocation of the shoe retainer plate is converted into linear reciprocation of the pistons. The stroke of the pistons is determined by the angular position of the shoe retainer plate.

The electrical controller 50, being responsive to the temperature signal generated by the temperature sensor 46 induces the stroking vane to establish a desired angular position relative to the rotatable shaft 74. Thus, the position of the rocker cam, the angular reciprocation of the piston shoe and the linear reciprocation of the pistons is automatically established by the controller according to the temperature sensored in the cool water basin of the cooling tower.

The hydraulic pump 40 is also provided with pressure compensation to thus maintain its hydraulic fluid output at a pressure and velocity that is optimum for operation of the hydraulic fan motor 30 at its appropriate speed. When a large bladed fan such as the fan 25 is rotated, it is subject to some degree of rotational vibration which thus causes the force transmitted between the fan and fan shaft to be somewhat irregular rather than a smooth force transition as is desired. The irregular force is then transmitted by the fan shaft to the hydraulic fluid being circulated through the fan motor. This develops a "ripple" effect in the fluid which is then sensed by the hydraulic pump. The reassure compensation system of the pump functions to smooth the ripple effect to which the hydraulic pump is subjected and thus maximizes the service life of the pump system and the service life of other mechanical features such as bearings, seals etc. which would be determined by this ripple effect.

The hydraulic system, including the hydraulic motor 30, the hydraulic pump 40, the hydraulic supply and return lines and the appropriate filters, coolers and reservoir for the hydraulic system establish a closed circuit hydraulic loop for operation of the cooling tower fan. Moreover, this closed circuit hydraulic operational loop is capable of being operated at a wide range of fluid velocities for operation of the cooling tower fan at a rotational speed which is optimum for the heat transfer characteristics being required of the cooling tower system at any point of time. The hydraulic system and thus maximum power output of the electric motor 38 will be utilized only under circumstances where maximum cooler capability is required of the heat exchange tower. During most of its operation, the hydraulic system will be operated at less than its maximum capability and thus the operational cost of the system will be effectively controlled according to the heat load characteristics being encountered.

During violent weather conditions the fan blades should be secured against rotation by turbulent high velocity wind. This feature is accomplished efficiently by providing a locking system for the fan assembly that may be operated from a remote location such as at ground level. In one suitable embodiment of this invention, the fan locking system of this invention may conveniently take the form of a hydraulic locking valve assembly shown at 79 at FIG. 4. This hydraulic locking valve assembly is capable of effecting closure of both the supply and return lines and may typically incorporate a pair of valves that are normally open but which may be closed by operating or maintenance personnel. When these valves are closed the hydraulic fluid in the supply and return lines and in the hydraulic motor will be static and will thereby prevent rotation of the fan. After the adverse weather condition has dissipated the locking valve system 79 is then moved to is open condition thereby allowing flow in the hydraulic supply and return lines. It is not necessary for operating personnel to gain access to the fan motor or fan blade in order to secure it against rotation as has been done in the past.

Referring now to FIG. 4. alternative aspects of the invention are shown with the cooling tower structure 10 and the hydraulic system and fan assembly being identified by like reference numerals. The cooling tower system of FIG. 4 is shown to be arranged for counter-flow operation such as will be employed when the cooling tower is subjected to extremely cold conditions where the water might be likely to freeze. The cooling tower 10 is provided with drift eliminators 80 and a water distribution manifold 82 having a plurality of water spray nozzles 83 for spraying water or other coolant fluid onto fill packing 84. The cooling tower is also provided with controllable louvers 86 which are positioned to permit air flow into the cooling tower o from the cooling tower to the outside ambient air. In this case the supply and return lines of the hydraulic circuit are provided with a control valve 88 which is operative responsive to appropriate signals from the controller 50 via the control conductor 52. The control valve 88 may be reversed by the signals of the controller 50 to thus reverse the flow in the supply and return lines and thus reverse the rotation of the hydraulic motor 30 and the fan mechanism 16. Again, the controller 50 may be responsive to the temperature sensor 46 in the cool water basin 44. Without significant change in the structure and operation of the electric motor and hydraulic pump, the direction of fan rotation may be reversed in the event that operational characteristics of the cooling tower so warrant. Accordingly, the cooling tower may be operated under extremely cold conditions without necessitating any significant changes in the operation and power control systems thereof. Without requiring the addition of anti-freeze additives to the cooling water, the cooling water will be protected against freezing.

In view of the foregoing it is clearly evident that a unique hydraulically energized cooling tower fan system has been provided herewith. The system provides a light weight hydraulic motor and fan assembly that may be efficiently supported at elevation within a cooling tower. Power components of the hydraulic system such as the hydraulic pump, pump drive motor, fluid reservoir, fluid cooler and filter assemblies etc. are located at a position remote from the fan, such as at ground level, where the same may be efficiently serviced even under circumstances where the cooling tower system is under operation. Replacement of mechanical components such as the hydraulic pump, the hydraulic motor etc. may be accomplished quickly and with minimal downtime of the cooling tower system. Most importantly, fire hazards and electrical hazards are effectively avoided by location of the electric motor and hydraulic pump system at ground level or at another appropriate location externally of the cooling tower environment. Through utilization of the present invention effective and efficient operation of the cooling tower system is controlled at all times. Cost of the cooling tower operation is effectively minimized and the cooling tower is rendered commercially efficient to is highest degree.

While the foregoing is directed to the preferred embodiment, the scope thereof is determined by the claims which follow.

What is claimed is:

1. A hydraulically energized fan system for water cooling towers and the like, comprising:
   (a) a rotary fan being positioned at the upper portion of a water cooling tower;
   (b) a hydraulic motor being positioned adjacent said rotary fan and having a driving connection with said rotary fan;
   (c) a hydraulic pump mechanism being located at a position remote from said rotary fan;
   (d) hydraulic supply and return lines interconnecting said hydraulic pump and said hydraulic motor and forming a closed-loop hydraulic system incorporating said hydraulic pump and hydraulic motor; and
   (e) means for reversing the flow of hydraulic fluid in said hydraulic supply and return lines to thus induce reversal of said hydraulic motor for rendering said rotary fan reversible.

2. The hydraulically energized fan system of claim 1, wherein:
   said hydraulic pump mechanism is located externally of and remote from said water cooling tower.

3. The hydraulically energized fan system of claim 2, wherein:
   (a) said hydraulic pump mechanism is located substantially at ground level; and
   (b) said hydraulic supply and return lines extend from said hydraulic motor and downwardly along the structure of said water cooling tower and to said hydraulic pump mechanism.

4. The hydraulically energized fan system of claim 1, wherein said hydraulic pump mechanism comprises:
   (a) a variable displacement hydraulic pump;
   (b) an electric motor interconnected in driving relation with said variable displacement hydraulic pump;
   (c) a hydraulic reservoir disposed in fluid coupled relation with said hydraulic return line; and
   (d) filtering and cooling means for cooling and cleaning hydraulic fluid received from said hydraulic return line to thus provide a supply of cleaned and cooled hydraulic fluid in said hydraulic reservoir.

5. The hydraulically energized fan system of claim 1, wherein: said hydraulic pump is an axial piston, variable displacement, pressure compensated hydraulic pump.

6. The hydraulically energized fan system of claim 1, including:
   means locking said rotary fan and said hydraulic motor from rotation to thus secure said fan system.

7. The hydraulically energized fan system of claim 6, wherein said fan locking means comprises:
   locking valve means for said hydraulic supply and return lines, said locking valve means being normally open during operation of said fan system and being closed to prevent hydraulic fluid flow in said hydraulic supply and return lines and said hydraulic motor, thereby locking said hydraulic motor and thus said rotary fan against rotation.

8. The hydraulically energized fan system of claim 1, wherein: the fluid output of said hydraulic pump is variable within a predetermined rotational speed range to thus induce rotation of said rotary fan within a predetermined range of fan speeds.

9. The hydraulically energized fan system of claim 8, including:
   (a) a temperature sensor circuit for sensing and providing signals reflecting the temperature of the coolant water at the base of said water cooling tower;
   (b) a controller device coupled to receive said signals of said water temperature circuit and being interconnected in controlling assembly with said hydraulic pump to select hydraulic pump output and thus hydraulic motor and fan speeds responsive to the temperature sensed by said temperature sensor.

10. The hydraulically energized fan system of claim 9, wherein (a) said hydraulic supply and return lines incorporate fluid reversing means; and
(b) said controller is interconnected in controlling relationship with said fluid reversal means.

11. The hydraulically energized fan system of claim 10, wherein said fluid reversal means is valve means coupled with said hydraulic supply and return lines.

12. A hydraulically energized fan system for water cooling towers and the like comprising:
(a) a rotary fan being positioned at the upper portion of the water cooling tower;
(b) a rotary hydraulic motor being position adjacent said rotary fan and having a rotary output shaft coupled in driving relation with said rotary fan;
(c) an axial piston, variable displacement, pressure compensated hydraulic pump being located at a position externally of said water cooling tower and at a position remote from said rotary fan;
(d) a single speed electric motor being connected in driving relation with said hydraulic pump;
(e) a hydraulic reservoir being interconnected in hydraulic fluid supplying relation with the suction of said hydraulic pump;
(f) hydraulic supply and return lines interconnecting said hydraulic pump, said hydraulic motor and said hydraulic reservoir and corporating therewith to form a closed-loop hydraulic system; and
(g) means for controlling the velocity of hydraulic fluid output of said hydraulic pump in response to the temperature of coolant fluid in the lower portion of said water cooling tower.

13. The hydraulically energized fan system of claim 12, wherein:
said hydraulic pump mechanism is located externally of and remote from said water cooling tower.

14. The hydraulically energized fan system of claim 12, wherein: said hydraulic pump mechanism is capable of variable velocity hydraulic fluid discharge for variable speed operation of said hydraulic motor.

15. The hydraulically energized fan system of claim 12, wherein: said hydraulic pump mechanism comprises:
(a) a variable displacement hydraulic pump;
(b) an electric motor interconnected in driving relation with said variable displacement hydraulic pump;
(c) a hydraulic reservoir disposed in fluid coupled relation with said hydraulic return line; and
(d) filtering and cooling means for cooling and cleaning hydraulic fluid received from said hydraulic return line to thus provide a supply of cleaned and cooled hydraulic fluid in said hydraulic reservoir.

16. The hydraulically energized fan system of claim 15, including:
(a) a temperature sensor circuit for sensing and providing signals reflecting the temperature of the coolant fluid at the base of said water cooling tower; and
(b) a controller device coupled to receive said signals of said water temperature circuit and being interconnected in controlling assembly with said hydraulic pump to select hydraulic pump output and thus hydraulic motor and fan speeds responsive to the temperature sensed by said temperature sensor.

17. The hydraulically energized fan system of claim 12, including:
means for reversing the flow of hydraulic fluid in said hydraulic supply and return lines to thus induce reversal of said hydraulic motor for rendering said rotary fan reversible.

18. The hydraulically energized fan system of claim 17, including:
(a) said hydraulic supply and return lines incorporate fluid reversing means; and
(b) said controller is interconnected in controlling relation with said fluid reversal means.

19. The hydraulically energized fan system of claim 18, wherein:
said fluid reversal means is valve means coupled with said hydraulic supply and return lines and is positionable for reversing hydraulic fluid flow in said supply and return lines by said controller.

20. The hydraulically energized fan system of claim 12, including:
means looking said rotary fan and said hydraulic motor from rotation to thus secure said fan system.

21. The hydraulically energized fan system of claim 20, wherein said fan looking means comprises:
locking valve means for said hydraulic supply and return lines, said locking valve means being normally open during operation of said fan system and being closed to prevent hydraulic fluid flow in said hydraulic supply and return lines and said hydraulic motor, thereby locking said hydraulic motor and thus said rotary fan against rotation.

* * * * *